(12) United States Patent
Kitahara et al.

(10) Patent No.: US 10,271,110 B2
(45) Date of Patent: Apr. 23, 2019

(54) TRANSMITTER, TRANSMISSION METHOD, RECEIVER, RECEPTION METHOD, AND COMPUTER PROGRAM

(71) Applicant: SATURN LICENSING LLC, New York, NY (US)

(72) Inventors: Jun Kitahara, Shizuoka (JP);
Yoshiharu Dewa, Tokyo (JP);
Katsunori Hashimoto, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/908,005

(22) PCT Filed: Jun. 23, 2014

(86) PCT No.: PCT/JP2014/066593
§ 371 (c)(1),
(2) Date: Jan. 27, 2016

(87) PCT Pub. No.: WO2015/040913
PCT Pub. Date: Mar. 26, 2015

(65) Prior Publication Data
US 2016/0192033 A1 Jun. 30, 2016

(30) Foreign Application Priority Data
Sep. 18, 2013 (JP) .................. 2013-193398

(51) Int. Cl.
*G08G 1/00* (2006.01)
*G08B 27/00* (2006.01)
(Continued)

(52) U.S. Cl.
CPC .......... *H04N 21/814* (2013.01); *G08B 27/00* (2013.01); *G08B 27/008* (2013.01);
(Continued)

(58) Field of Classification Search
CPC .......... H04N 21/814; H04N 21/23614; H04N 21/41415; H04N 21/4882; H04N 21/615;
(Continued)

(56) References Cited

U.S. PATENT DOCUMENTS 8,458,752 B2 6/2013 Yun et al.
9,236,964 B2 * 1/2016 Oh .................. H04L 1/0041
(Continued)

FOREIGN PATENT DOCUMENTS

CA 2 837 053 A1 11/2012
CN 1867839 A 11/2006
(Continued)

OTHER PUBLICATIONS

Extended European Search Report issued in European Application No. 14845627.0 dated Aug. 29, 2017.
(Continued)

*Primary Examiner* — Nathan J Flynn
*Assistant Examiner* — Caroline Somera
(74) *Attorney, Agent, or Firm* — Oblon, McClelland, Maier & Neustadt, L.L.P.

(57) ABSTRACT

Transmission of emergency alert information using a broadcasting service in an appropriate manner is achieved. A transmitter 200 (broadcasting station) inserts a wake-up signal as signaling of emergency alert information, describes information including a scale (category), type, occurrence time, and occurrence position of disaster, and version information as a message of emergency alert information, and transmits the message using a packet structure of a physical layer. A simple and inexpensive receiver 300 equipped with only a receiving antenna for broadcasting and a demodulator can receive the message of emergency alert information. An evacuation direction and a map or route to a shelter can be
(Continued)

displayed using digital signage or streetlights, and an evacuation route can be instructed using streetlights.

18 Claims, 13 Drawing Sheets

(51) Int. Cl.
*H04N 21/61* (2011.01)
*H04N 21/81* (2011.01)
*H04N 21/236* (2011.01)
*H04N 21/237* (2011.01)
*H04N 21/414* (2011.01)
*H04N 21/488* (2011.01)

(52) U.S. Cl.
CPC ..... *H04N 21/237* (2013.01); *H04N 21/23614* (2013.01); *H04N 21/41415* (2013.01); *H04N 21/4882* (2013.01); *H04N 21/615* (2013.01); *G08G 1/205* (2013.01)

(58) Field of Classification Search
CPC .... H04N 21/237; G08B 27/00; G08B 27/008; G08G 1/205
USPC .......................................................... 725/33
See application file for complete search history.

(56) References Cited

U.S. PATENT DOCUMENTS

| | | | | |
|---|---|---|---|---|
| 2006/0161946 | A1* | 7/2006 | Shin | H04L 12/2827 725/33 |
| 2008/0085695 | A1* | 4/2008 | Vare | G08B 25/08 455/404.1 |
| 2010/0088718 | A1* | 4/2010 | Hasek | G08B 25/085 725/33 |
| 2010/0122284 | A1* | 5/2010 | Yoon | H04N 5/4401 725/33 |
| 2010/0180294 | A1* | 7/2010 | Yun | H04H 20/59 725/33 |
| 2010/0186030 | A1* | 7/2010 | Yun | H04H 20/82 725/33 |
| 2010/0330951 | A1* | 12/2010 | Chen | H04W 4/90 455/404.1 |
| 2011/0202956 | A1* | 8/2011 | Connelly | H04N 21/433 725/38 |
| 2012/0236735 | A1 | 9/2012 | Nory et al. | |
| 2013/0142066 | A1* | 6/2013 | Yamaguchi | H04L 49/109 370/252 |
| 2013/0236735 | A1 | 9/2013 | De Wit et al. | |
| 2013/0278385 | A1* | 10/2013 | Baskin | H04W 76/007 340/7.51 |
| 2013/0278418 | A1* | 10/2013 | Vallaire | G08B 27/00 340/539.13 |
| 2013/0318564 | A1* | 11/2013 | Song | H04N 21/23614 725/110 |
| 2014/0120861 | A1* | 5/2014 | Kwak | H04N 19/89 455/404.1 |
| 2014/0250456 | A1* | 9/2014 | Ramkumar | H04N 21/814 725/33 |
| 2015/0007220 | A1* | 1/2015 | Nakano | H04N 21/4424 725/33 |

FOREIGN PATENT DOCUMENTS

| | | |
|---|---|---|
| CN | 101754121 A | 6/2010 |
| CN | 101938703 A | 1/2011 |
| CN | 102868966 A | 1/2013 |
| CN | 102917329 A | 2/2013 |
| JP | 2010-035085 A | 2/2010 |
| JP | 2010-166578 A | 7/2010 |
| JP | 2010-245897 A | 10/2010 |
| JP | 2012-142965 A | 7/2012 |
| JP | 2012-156725 A | 8/2012 |

OTHER PUBLICATIONS

Advanced Television Systems Committee, "ATSC Mobile DTV Standard: A/153 Part 10, Mobile Emergency Alert System (A/153 Part 10:2013)," Mar. 11, 2013, XP055178642, http://www.atsc.org/cms/standards/a153/A153-Part-10-2013.pdf.

Combined Office Action and Search Report dated Apr. 19, 2018 in Taiwanese Patent Application No. 103131153 (with English translation of categories of cited documents), 12 pages.

Office Action dated Apr. 28, 2018, in corresponding Chinese Patent Application No. 201480049415.6 (with English-language translation).

\* cited by examiner

FIG.6

| Syntax | No.Bits | Format |
|---|---|---|
| header_extension{ | | |
|   wake_up_indicator | 1 | bslbf |
|   if(wake_up_indicator==true){ | | |
|     version | 16 | uimsbf |
|     message_level | 4 | bslbf |
|     if(message_level==high){ | | |
|       category | 5 | bslbf |
|       type | 4 | bslbf |
|       time | 40 | bslbf |
|       north_south | 1 | bslbf |
|       latitude | 16 | bslbf |
|       east_west | 1 | bslbf |
|       longitude | 16 | bslbf |
|       level | 4 | bslbf |
|     } | | |
|     message_provider_id | 8 | uimsbf |
|     fixed_message | 1 | bslbf |
|     if(fixed_message==true | | |
|       fixed_message_id | 16 | uimsbf |
|     EAS_message_length | 16 | uimsbf |
|     for(i=0;i<EAS_message_length){ | | |
|       EAS_message_byte() | var | var |
|     } | | |
|   } | | |
| } | | |

FIG.7

| fixed_message_id | fixed_message |
|---|---|
| 1 | Earthquake has occurred !! |
| 2 | Tsunami has occurred !! |
| 3 | Hurricane warning |
| ⋮ | ⋮ |

FIG.8

| | Syntax | No.Bits | Format |
|---|---|---|---|
| 801 | EAS_message_descriptor{ | | |
| 802 | table_id | 8 | uimsbf |
| 803 | alert_id | 8 | uimsbf |
| 804 | wake_up_indicator | 1 | bslbf |
| | if(wake_up_indicator==true){ | | |
| 805 | version | 16 | uimsbf |
| 806 | message_level | 4 | bslbf |
| | if(message_level==high){ | | |
| 807 | category | 4 | bslbf |
| 808 | type | 4 | bslbf |
| 809 | time | 40 | bslbf |
| 810 | north_south | 1 | bslbf |
| 811 | latitude | 16 | bslbf |
| 812 | east_west | 1 | bslbf |
| 813 | longitude | 16 | bslbf |
| 814 | level | 4 | bslbf |
| | } | | |
| 815 | message_provider_id | 8 | uimsbf |
| 816 | fixed_message | 1 | bslbf |
| | if(fixed_message==true | | |
| 817 | fixed_message_id | 16 | uimsbf |
| 818 | EAS_message_length | 16 | uimsbf |
| | for(i=0;i<EAS_message_length;i++){ | | |
| 819 | EAS_message_byte() | var | car |
| | } | | |
| 820 | CRC32 | 32 | bslbf |
| | } | | |

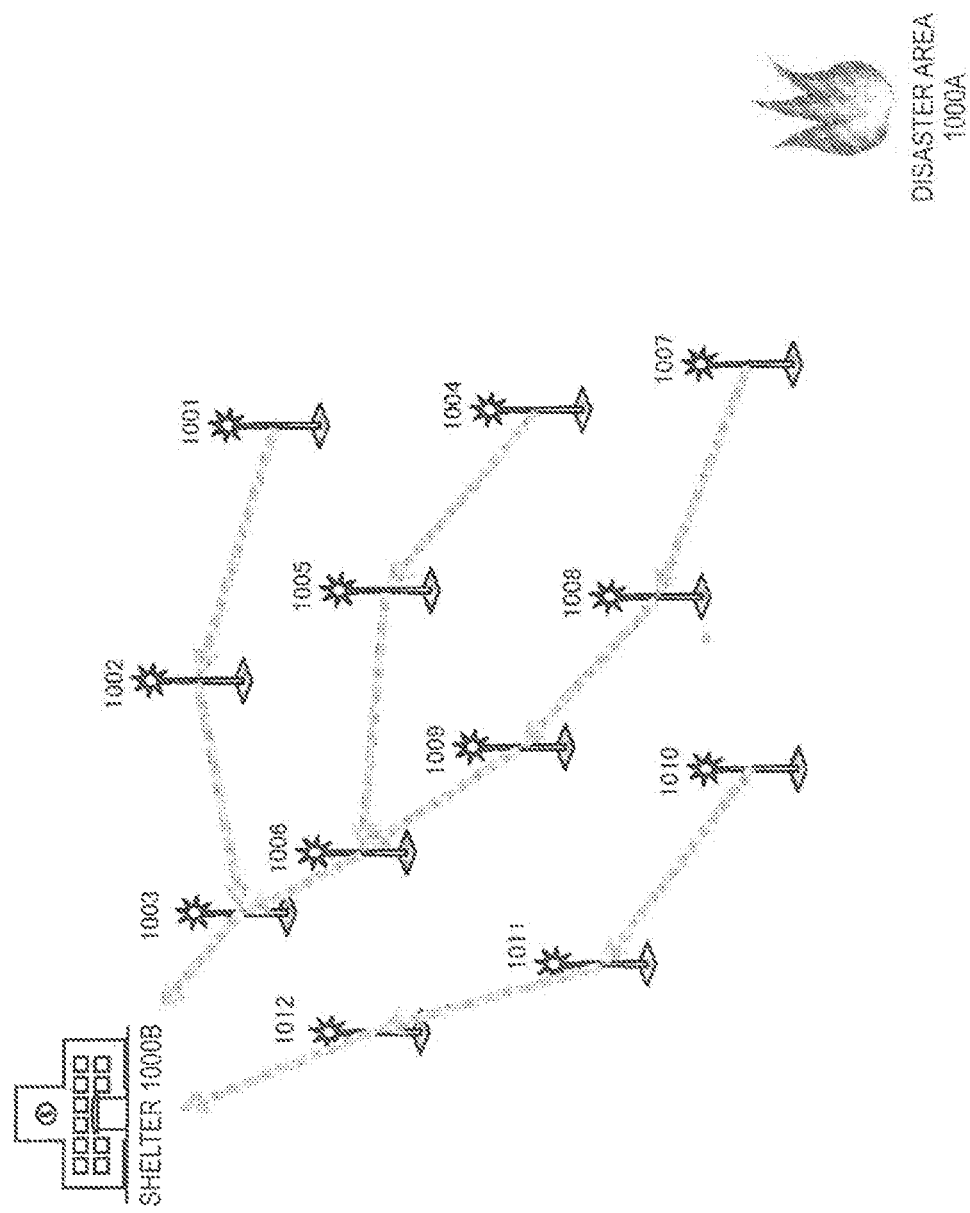

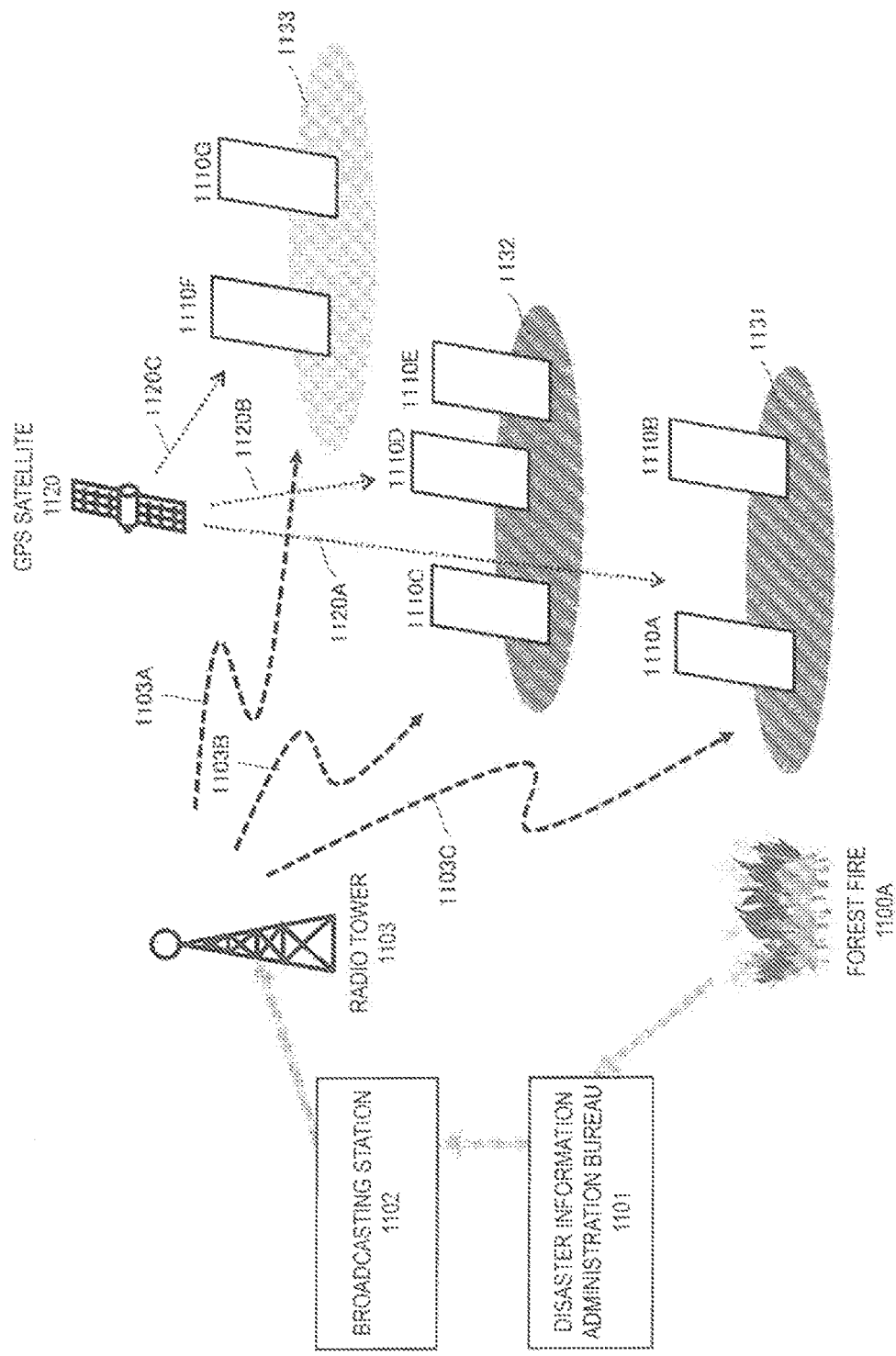

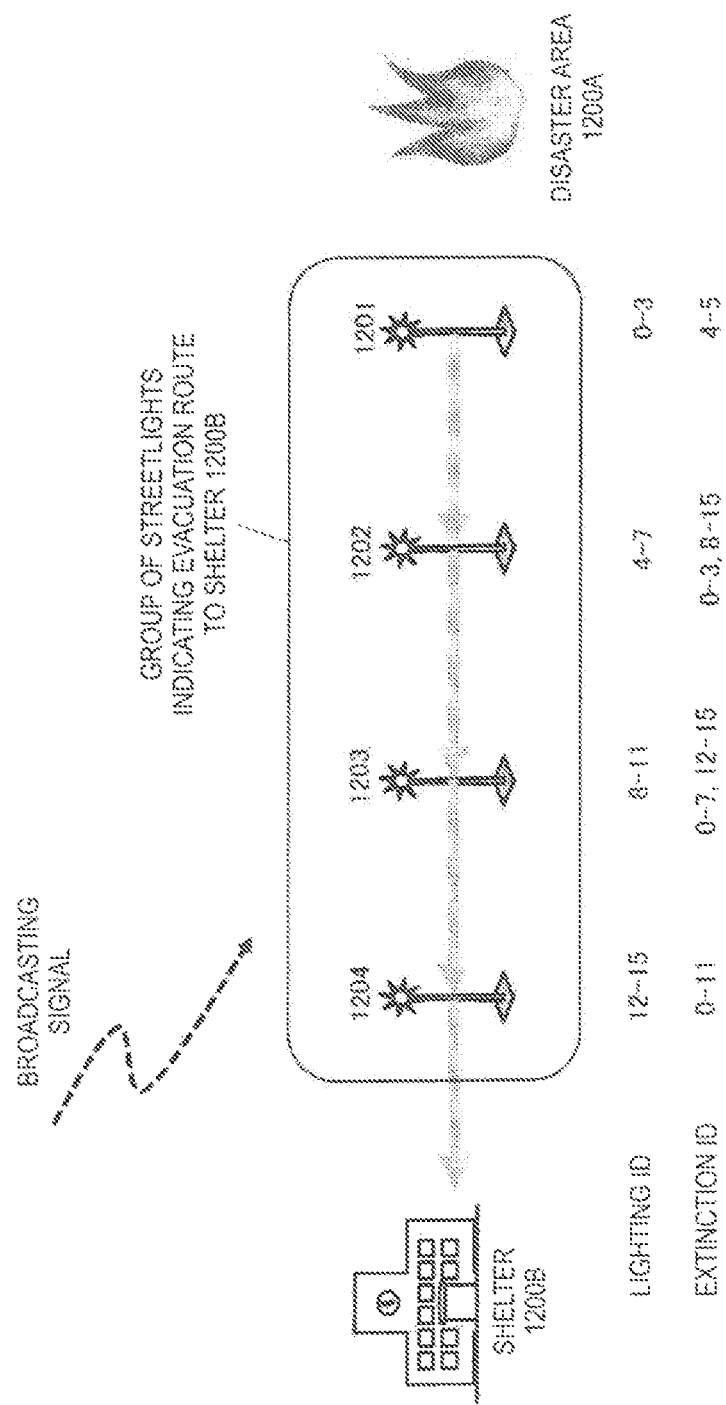

FIG.13

| Syntax | No.Bits | Format |
|---|---|---|
| header_extension() { | | |
|   wake_up_indicator | 1 | bslbf |
|   if(wake_up_indicator==true){ | | |
|     version | 16 | uimsbf |
|     message_level | 4 | bslbf |
|     if(message_level==high){ | | |
|       category | 4 | bslbf |
|       type | 4 | bslbf |
|       time | 40 | bslbf |
|       north_south | 1 | bslbf |
|       latitude | 16 | bslbf |
|       east_west | 1 | bslbf |
|       longitude | 16 | bslbf |
|       level | 4 | bslbf |
|     } | | |
|     message_provider_id | 8 | uimsbf |
|     fixed_message | 1 | bslbf |
|     if(fixed_message==true | | |
|       fixed_message_id | 16 | uimsbf |
|     EAS_message_length | 16 | uimsbf |
|     for(i=0;i<EAS_message_length){ | | |
|       EAS_message_byte() | var | var |
|     } | | |
|     EAS_message_id | 4 | bslbf |
|   } | | |
| } | | |

TRANSMITTER, TRANSMISSION METHOD, RECEIVER, RECEPTION METHOD, AND COMPUTER PROGRAM

TECHNICAL FIELD

The technology disclosed herein relates to a transmitter and transmission method for transmitting emergency alert information, a receiver and reception method for receiving emergency alert information, and a computer program.

BACKGROUND ART

As the terrestrial digital television broadcasting standard, technologies such as digital video broadcasting (DVB), advanced television systems committee (ATSC), and integrated services digital broadcasting (ISDB) have been developed in Europe, America, and Japan, respectively.

In the terrestrial digital broadcasting, it is possible to provide a data broadcasting service obtained by superimposing various data on the main portion of a broadcasting program including AV content. For example, the notification of emergency information feat is necessary to report speedily can be performed using data broadcasting. Examples of the emergency information described herein include information regarding natural disasters including earthquake, tsunami caused by earthquake, typhoon, heavy rain, storm, tornado, flood, and forest fire, an occurrence of large-scale terrorism, a transportation operation condition (e.g. disturbance of the arrival and departure time of a school bus), information regarding school (e.g. change in the arrival and departure time at school, cancellation of class, and closure caused by prevalence of infections diseases), and other various administrative services.

In the ISDB, a signal for transmitting an emergency alert that serves as am emergency alert information descriptor is defined in a program management table (PMT) packet of the program-specific information. For example, the digital broadcasting receiver has been developed that detects an alert target area from an emergency information descriptor in PMT included in emergency alert broadcasting and determines whether the current position is included in the alert target area of the emergency alert broadcasting, enabling fee user to intuitively recognise the target area, current area, and associated areas for the emergency alert broadcasting (e.g. refer to Patent Literature 1).

Furthermore, in the ATSC mobile/handheld (M/H) that allows an ATSC broadcasting service to be received by mobile devices, it is possible to transmit alert information by adding the emergency alert table (EAT-MH) to the service-signaling channel. For example, fee broadcasting signal receiver has bees developed that continues to output an emergency alert even during the intra-cell handover by the use of EAT information contained in the broadcasting signal and channel information of a cell (e.g. refer to Patent Literature 2). In this case, the EAT information contain a cell indicator, and the channel information of a cell contains virtual channel information of the cell.

SUMMARY OF INVENTION

Technical Problem

An object of exemplary technology described herein is to provide an improved transmitter and transmission method capable of transmitting emergency alert information in an appropriate manner, and an improved receiver and reception method capable of transmitting emergency alert information in an appropriate manner, and a computer program.

Another object of exemplary technology described herein is to provide an improved transmitter and transmission method, receiver and reception method, and computer program, capable of transmitting emergency alert information using a broadcasting service in an appropriate manner.

Solution to Problem

The present application is based on the above-described problem. The technology recited in claim 1 is a transmitter including: an emergency alert information acquisition unit configured to acquire emergency alert information; and a transmitting unit configured to transmit the emergency alert information using a packet structure of a physical layer or an extension header of a date link layer.

According to the technology recited in claim 2 of the present application, the transmitting unit of the transmitter according to claim 1 is configured to transmit the transmission frame in a broadcast channel assigned to a broadcasting station.

According to the technology recited in claim 3 of the present application, the transmitter according to claim 2 farther includes: a broadcast content acquisition unit configured to acquire broadcast content. The transmitting unit is configured to transmit the broadcast content using a packet structure of a middleware layer.

According to the technology recited in claim 4 of the present application, the transmitting unit of the transmitter according to claim 1 is configured to store signaling and a message of the emergency alert information in a header of a data link packet.

According to the technology recited in claim 5 of the present application, the transmitting unit of the transmitter according to claim 4 is configured to insert a wake-up indicator to be used for a receiver into the signaling of the emergency alert information.

According to the technology recited in claim 6 of the present application, the transmitting unit of the transmitter according to claim 4 is configured to insert a level of a message into the signaling of the emergency alert information.

According to the technology recited is claim of the present application, the transmitting unit of the transmitter according to claim 4 is configured to insert at least one of a category of disaster, a type of disaster, an occurrence time of disaster, an occurrence position of disaster, and a scale of disaster into the signaling of the emergency alert information.

According to the technology recited in claim 8 of the present application, the transmitting unit of the transmitter according to claim 4 is configured to insert indication information indicating a feed length message or a variable length message into the message of the emergency alert information.

According to the technology recited in claim 9 of the present application, the transmitting unit of the transmitter according to claim 4 is configured to store die signaling and the message of the emergency alert information using an extension header of a data link packet.

The technology recited in claim 10 of the present application is a transmission method including: an emergency alert information acquisition step of acquiring emergency alert information; and a transmission step of transmitting the emergency alert information using a packet structure of a physical layer or an extension header of a data link layer.

The technology recited in claim 11 of the present application is a receiver including: a receiving antenna; a demodulator configured to demodulate a signal received via the receiving antenna; and a processor configured to process emergency alert information included hi a packet structure of a physical layer or an extension header of a data link layer in a received frame.

According to the technology recited in claim 12 of the present application, the processor of the receiver according to claim 11 is configured to analyze signaling of the emergency alert information stoned in a header of a received data link packet and displays an emergency message based on a result obtained by the analysis.

According to the technology recited in claim 13 of the present application, the processor of the receiver according to claim 12 is configured to analyze the signaling of the emergency alert information including at least one of a category of disaster, a type of disaster, an occurrence time of disaster, an occurrence position of disaster, and a scale of disaster.

According to the technology recited in claim 14 of the present application, the processor of the receiver according to claim 11 is configured to analyze a message of the emergency alert information stored in a header of a received data link packet and displays an emergency message based on a result obtained by the analysis.

According to the technology recited in claim 15 of the present application, the processor of the receiver according to claim 14 is configured to analyze the message of the emergency alert information including indication information indicating a fixed length message or a variable length message.

According to the technology recited in claim 16 of the present application, the receiver according to claim 11 further includes: a position information acquisition unit configured to acquire position information. The processor is configured to display an emergency message based on a result obtained by analyzing the emergency alert information stored in a header of a received data link packet and the position information.

According to the technology recited in claim 17 of the present application, in the receiver according to claim 16, the emergency alert information includes information regarding a position at which a disaster occurs. The processor is configured to display a message of alert information and an evacuation instruction when the position information is within a target area for an alert and an evacuation, and the processor generates and displays only the message of the emergency alert information when the position information is outside the target area for the alert and the evacuation.

According to the technology recited in claim 18 of the present application, the receiver according to claim 11 further includes: a wake-up indicator filter configured to detect a wake-up indicator included in the emergency alert information; and a power controller configured to control a power source in the receiver based on a result obtained by the detection.

The technology recited in claim 19 of the present application is a reception method including: a demodulation step of demodulating a received signal; and a processing step of processing emergency alert information included in a packet structure of a physical layer or an extension header of a data link layer in a received frame.

The technology recited in claim 20 of the present application is a computer program written in a computer-readable form for causing a computer to function as: a demodulator configured to demodulate a received signal; and a processor configured to process emergency alert information included in a packet structure of a physical layer or an extension header of a data link layer in a received frame.

The computer program according to claim 20 is defined as a computer program written in a computer-readable form to implement a predetermined process on a computer. In other words, installation of the computer program according to claim 20 on a computer allows synergistic or cooperative effects to be obtained, thereby achieving advantageous effects similar to those of the receiver according to claim 11.

Advantageous Effects of Invention

According to the technology described herein, it is possible to provide an improved transmitter and transmission method, receiver and reception method, and computer program, capable of transmitting the emergency alert information in an appropriate manner using a broadcasting service.

According to the technology described herein, the transmitter can use the packet structure of the physical layer or the extension header of the data link layer to transmit the signaling and message of emergency alert information in the broadcasting service. Thus, an expensive receiver provided with the broadcasting antenna and the demodulator can process the message of emergency alert information. In other words, a broadcasting service to provide advanced emergency alert information for a variety of different receivers can be achieved. Moreover, the receiver can process the message of emergency alert information even when not all of the middleware layer or the application layer functions, and thus a shorter time is taken to start up from standby state (intermittent reception state), thereby advantageous in terms of power consumption.

In addition, the effects described in the present specification are merely illustrative and demonstrative, and not limitative. In other words, the technology according to the present disclosure can exhibit other effects that are evident to those skilled in the art along with or instead of the effects based on the present specification.

The above and other objects, features, and advantages of the present disclosure will be made clear later by a more detailed explanation that is based on the embodiments of the present disclosure and the appended drawings.

BRIEF DESCRIPTION OF DRAWINGS

FIG. 6 is a diagram illustrating an exemplary structure of the signaling of emergency alert information stored in an extension header of a data link header 421.

FIG. 7 is a diagram illustrating an exemplary association relationship between a fixed message indicator and a fixed message.

FIG. 8 is a diagram illustrating an exemplary structure of the signaling of emergency alert information stored in a preamble of a transmission frame or in a payload 422 of a data link packet 420.

FIG. 10 is a diagram illustrating an embodiment in which each streetlight placed in die city is equipped with the function of the receiver 300.

FIG. 11 is a diagram illustrating an embodiment in which digital signage is equipped with, the function of the receiver 300.

FIG. 12 is a diagram illustrating another embodiment in which each streetlight placed in the city is equipped with the function of the receiver 300.

FIG. 13 is a diagram illustrating a structure of the signaling of emergency alert information including an ID for flashing control (EAS_message_id) 617.

DESCRIPTION OF EMBODIMENTS

Embodiments of the technology illustrated herein will be described in detail with, reference to drawings.

Figure 1:
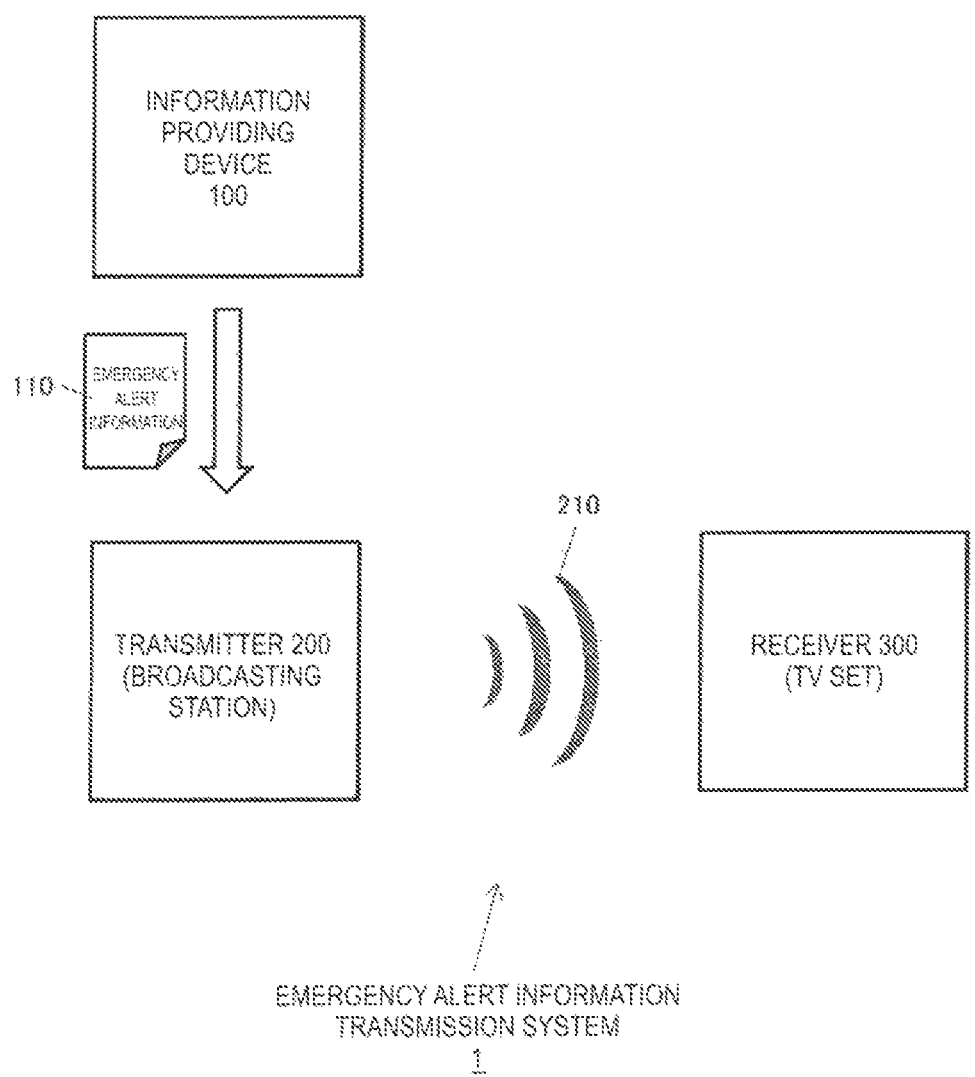
FIG. 1 is a schematic diagram illustrating an exemplary configuration of an emergency alert information transmission system 1.

FIG. 1 schematically illustrates an exemplary configuration of an emergency alert information transmission system 1. The emergency alert information transmission system 1 that is illustrated is configured to include an information providing device 100 configured to provide emergency alert information, a transmitter 200 configured to transmit the provided emergency alert information 110, and a receiver 300 configured to receive the emergency alert information and notify it to the neighboring risers.

The information providing device 100 is operated by a government agency, such as Meteorological agency or other disaster information administration bureau that, serves as an warning-issuing agency. The information providing device 100 provides the receiver 200 with the emergency alert information 110 used to alert the occurrence of various emergency events, such as natural disasters including earthquake, tsunami caused by earthquake, typhoon, heavy rain, storm, tornado, flood, and forest fire, the occurrence of large-scale terrorism, the transportation operation condition, and information regarding school.

A communication channel for connecting between the information providing device 100 and the transmitter 200 may have any configuration. For example, as the communication channel, a public network including the Internet or a dedicated line can be used. The emergency alert information may be written on paper medium rather than a form of digital data and may be sent to the user of the transmitter 200 by using a facsimile or the like.

The emergency alert information 110 may be described in any form of digital data. The emergency alert information 110 may be described hi the form of a structure description language such as extensible markup language (XML). For example, the agent who issues emergency alert information such as the United States Department of Homeland Security or the United States Geological Survey (USGS) creates a message in the form called the integrate public alert and warning system (IPAWS), then converts the message into a common XML-based data format to the emergency alert information called the common alerting protocol (CAP). This allows information of a wide variety of types of warnings or emergency alerts to be exchanged. In the message in the form of CAP, rich media such as the hypertext transfer protocol (HTML), the joint photographic experts group (GPEG), the moving picture experts group (MPEG) 4-video can be contained, as well as text information. The information providing device 100 may be configured to provide the transmitter 200 with the emergency alert information 110 in the form of CAP.

The transmitter 200 is operated by a broadcasting station that performs a digital broadcasting service of terrestrial waves or satellite waves, and the transmitter 200 broadcasts a broadcasting signal 210 composed of a prescribed format such as a television program. Although FIG. 1 illustrates only one transmitter 200 for simplicity, it should be understood that the transmitter 200 is provided for each broadcasting station.

Examples of the broadcasting service provided by the transmitter 200 include a digital television broadcasting service that can be viewed on a stationary television set and a broadcasting service for a mobile (mobile/handheld) device. As a broadcasting service, the terrestrial wave broadcasting is assumed to be used, but the satellite wave broadcasting also may be used.

In the present embodiment, the transmitter 200 broadcasts the broadcasting signal obtained by inserting emergency alert information in a form that will be described later into the broadcasting signal 210 for delivering moving image content such as a television program. In the state (ordinary state) in which there is no emergency alert information to be notified, vacancy information is stored in a field in which emergency alert information is inserted or the field itself is omitted from the broadcasting signal.

In FIG. 1, although the transmitter 200 is configured to receive the emergency alert information 110 from the information providing device 100 operated by a government agency, the transmitter 200 may be configured to acquire emergency alert information from an information source other than the information providing device 100. The information providing device 100 is not necessarily operated by a government agency, but may be operated by a private organization or a broadcasting station itself.

The receiver 300 may be a television set or a set-top box, and is provided with a toner configured to receive the digital broadcasting signal 210 of terrestrial waves or satellite waves. Although one or more of television sets or set-top boxes are assumed to be provided in each home, FIG. 1 illustrates only one receiver 300 for simplicity. The broadcasting service for a mobile device is also superimposed on the digital broadcasting signal 210, and die receiver 300 may be various devices using such a broadcasting service, such as mobile devices for personal use (a multi-function terminal such as smartphones or tablets, and an electronic book). Thus, it is assumed that there are many different kinds of receivers 300 throughout the city. Whatever the receiver 300 takes any form described above, the receiver 300 can decode the emergency alert information inserted into the received broadcasting signal in the form described later. In this case, the receiver 300 displays an alert message on a screen or it outputs a warning sound, and thus an alert is immediately presented to the user near the receiver 300.

Figure 2:
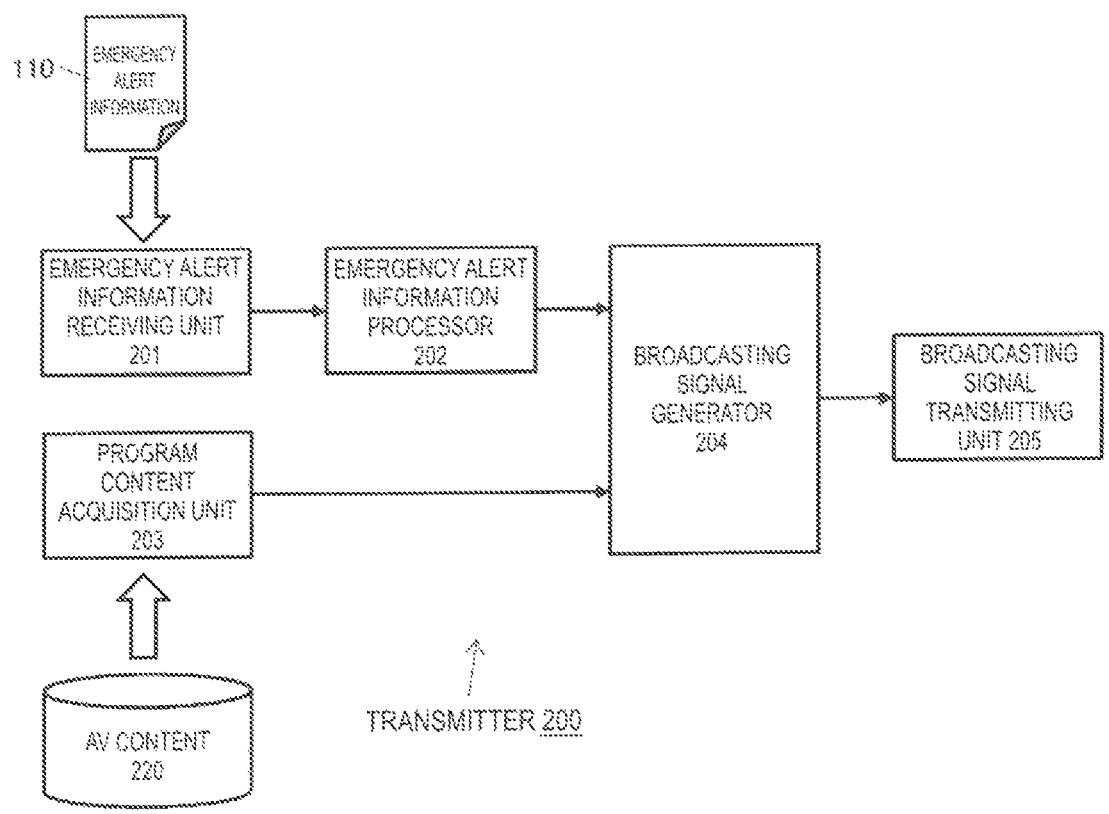
FIG. 2 is a schematic diagram illustrating an internal configuration of a transmitter 200.

FIG. 2 schematically illustrates an internal configuration of the transmitter 200. The transmitter 200 that is illustrated is configured to include an emergency alert information receiving unit 201, an emergency alert information processor 202, a program content acquisition unit 203, a broadcasting signal generator 204, and a broadcasting signal transmitting unit 205.

The emergency alert information receiving unit 201 receives the emergency alert information 110 that is described in the form of CAP or any other formats from the information providing device 100 via a communication channel such as a public network including the Internet or a dedicated line (neither of them are illustrated).

The emergency alert information processor 202 performs a filtering process on the received emergency alert information 110 to remove any unnecessary information (e.g. information that is unrelated to a broadcast service area) and extracts data as the emergency alert information to be inserted into the broadcasting signal.

The program content acquisition unit 203 acquires AV content as a main portion of the broadcasting program or data to be provided as data broadcasting. The program content acquisition unit 203 may take lie relevant AV content out from the storage location 220 of the AV content that is previously recorded depending on the broadcast time zone and may be supplied with the live AV content from a studio or a location.

The broadcasting signal generator 204 generates a broadcasting signal in the format conforming to a predetermined broadcasting standard. Examples of the broadcasting standard include the advanced television systems committee (ATSC) standard employed by United States, Canada, Mexico, and South Korea. The configuration of a transmission frame used to transmit the broadcasting signal will be described in detail later.

The broadcasting signal transmitting unit 205 performs a process including encoding, digital modulation suck as orthogonal frequency division multiplexing (OFDM), DA conversion, up-conversion to the RF band (a frequency channel assigned to the broadcasting station), and power amplification on the broadcasting signal generated by the broadcasting signal generator 204. The resultant signal is transmitted via a transmission antenna such as a radio tower (not shown).

The functional modules 201 to 205 described above is not necessarily physically arranged in a single device, but at least some functional modules may be configured as physically independent devices from other functional modules. For example, the emergency alert information processor 202 may be configured as an emergency alert information processing server on the Internet (not shown).

As described above, the transmitter 200 inserts the emergency alert information into the broadcasting signal in case of an emergency event. The emergency events occur in case of the occurrence of natural disasters including earthquake, tsunami caused by earthquake, typhoon, heavy rain, stems, tornado, flood, and forest fire, in case of the occurrence of large-scale terrorism, in case of disturbance of the arrival and departure time of school has, in case of a change in the arrival and departure time at school, in case of a change in the arrival and departure time at school and cancellation of class, and in case of the closure caused by the prevalence of infectious diseases. The insertion of the emergency alert information into the broadcasting service for mobile devices by the transmitter 200 allows various devices such as mobile devices capable of using the broadcasting service to receive the emergency alert information. Thus, it is possible to issue a warning on the emergency event from a mobile device or the like throughout the city.

A method of transmitting the emergency alert information from the transmitter 200 using a broadcasting service will be considered.

When the emergency alert information is transmitted using a packet structure of a layer higher than fee middleware layer, the application layer, or the like (e.g. refer to Patent Literature 2), it is possible to provide even detailed information. However, the receiver 300 that does not retain all the broadcasting services fails to receive the arrived emergency alert information and to display it on a screen. In other words, the receiver 300 is necessarily equipped with the function of all the layers of physical, middleware, and application, to display the emergency alert information, which leads to increase in the cost of the device. The receiver 300 can display the emergency alert information on the premise that all the layers from the physical layer to the application layer are operated, which leads to increase in the time to start up from standby state (intermittent reception state). The receiver 300 that is fully equipped with ail die layers from the physical layer to the application layer is also disadvantageous in terms of power consumption.

For example, the information on natural disasters including earthquake, tsunami, tornado, flood, and forest fire is especially critical emergency alert information. The detailed information including the occurrence place, occurrence time, and disaster scale (category or magnitude) regarding such disasters is necessary to be notified in a short time. The critical emergency alert information can be displayed throughout the city using various devices including a television set or some mobile devices provided in a home, which leads to the contribution to the instruction of an evacuation route.

In the present embodiment, the transmitter 200 is configured in such a way that the packet structure of the physical layer or the extension header of the date link layer is used for transmission of the signaling of emergency alert information and the message of emergency alert information in the broadcasting service.

In digital television broadcasting and emergency broadcasting service, all the basic functions of the television set, including demodulation, demultiplexing, middleware processing, decoding, display processing on the received broadcasting wave are necessarily equipped. Meanwhile, as described above, for the message of emergency alert information transmitted using the packet structure of the physical layer or the extension header of the data link layer from the transmitter 200, the receiver 300 can receive and display the message as long as it is equipped with only a receiving antenna and a demodulator for broadcasting. In other words, the emergency alert information transmission system 1 can be configured to include a simple and inexpensive receiver 300 for emergency alert information without a tuner for digital television broadcasting. This simple and inexpensive receiver 300 takes a shorter time to start up from standby state (intermittent reception state), and thus it is advantageous in terms of power consumption.

Even when the receiver 300 is equipped with ail the basic functions to serve as a television set, it is possible to perform processing on the message of emergency alert information using the packet structure of the physical layer or the extension header of the data link layer even. If not all of the fractions of the middleware layer or the application layer perform their functions, and thus the tune necessary to start up from standby state (intermittent reception state) is reduced, which leads to an advantage in terms of power consumption.

The receiver 300 having a simple configuration that is equipped with a receiving antenna and a demodulator for broadcasting can be installed on digital signage (an electronic signboard), a streetlight, or a vehicle that is not equipped with a television tuner. In this case, the message of emergency alert information can be displayed throughout the city in a short time, which leads to the contribution to the instruction of an evacuation route.

For example, the transmitter 200 inserts a wake-up indicator into the signaling of emergency alert information and describes a category, type, occurrence time, occurrence position, level, or the like of the disaster therein as the emergency alert information, and transmits it using the packet structure of the physical layer or the extension header of the data link layer.

The receiver 300 may be configured to operate, for example, in two modes of a standby mode and a full-fledged operation mode. In the standby mode, a demodulator is intermittently operated and the broadcasting signal is intermittently received. In the full-fledged operation mode, the power supply of the entire device is turned on. When the receiver 300 receives intermittently the wake-up indicator that is inserted as the signaling in the standby mode, the receiver 300 is switched into the full-fledged operation mode and puts the emergency alert information service into effect. For example, when the category of a disaster is a meteorological disaster, the receiver 300 displays a message of emergency alert information. The receiver 300 presents the effect useful in evacuation guidance by displaying an appropriate evacuation route from its own position information.

The mechanism of transmission by the transmitter 200 of the signaling and message of emergency alert information using the packet structure of the physical layer or the extension header of the data link layer will be described with reference to FIGS. 4 to 6.

Figure 4:
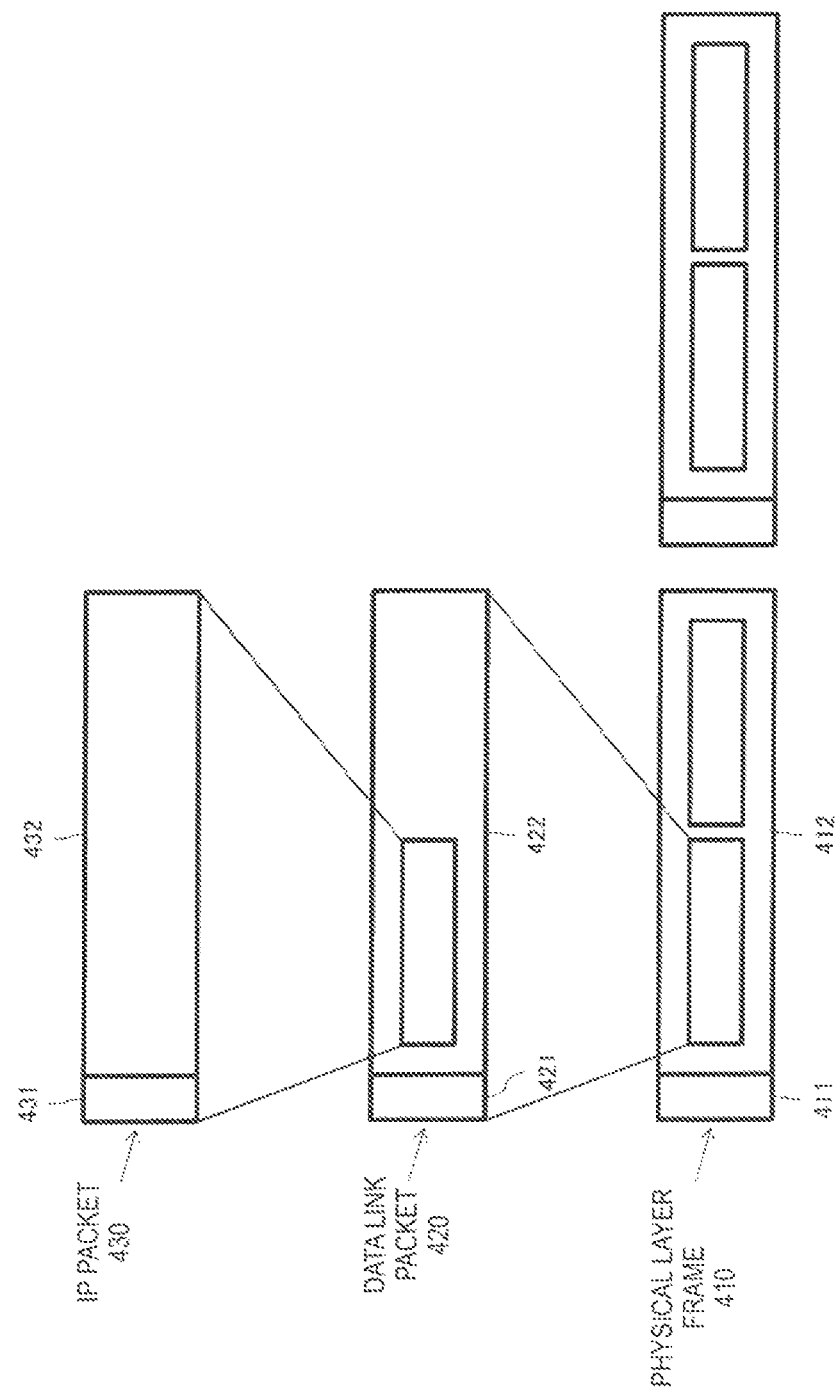
FIG. 4 is a diagram illustrating a protocol stack (format spectrum) used for the transmission of a broadcasting signal.

The transmission of a broadcasting signal is performed by using a protocol stack in which the physical (PHY), data link (DL), and internet protocol (IP) layers are piled up in this order from the lowest layer as shown in FIG. 4 (under the condition that IP scheme is applied to the transport layer). Higher layers than the IP layer are not directly related to the technology disclosed herein, and thus illustration thereof is omitted.

A physical layer frame 410 includes a physical layer header 411 and a physical layer payload 412 in which one or more data link packets 420 are stored. The data link packet 420 includes a data link header 421 and a data link payload 422 in which one or more IP packets 430 are stored. The IP packet 430 includes an IP header 431 and an IP payload 432. In the present embodiment, the signaling and the message of emergency alert information are described in the data link header 421. Thus, the packet structure of the physical layer or the extension header of the data link layer can be used for transmission of the signaling and the message of emergency alert information.

Figure 5:
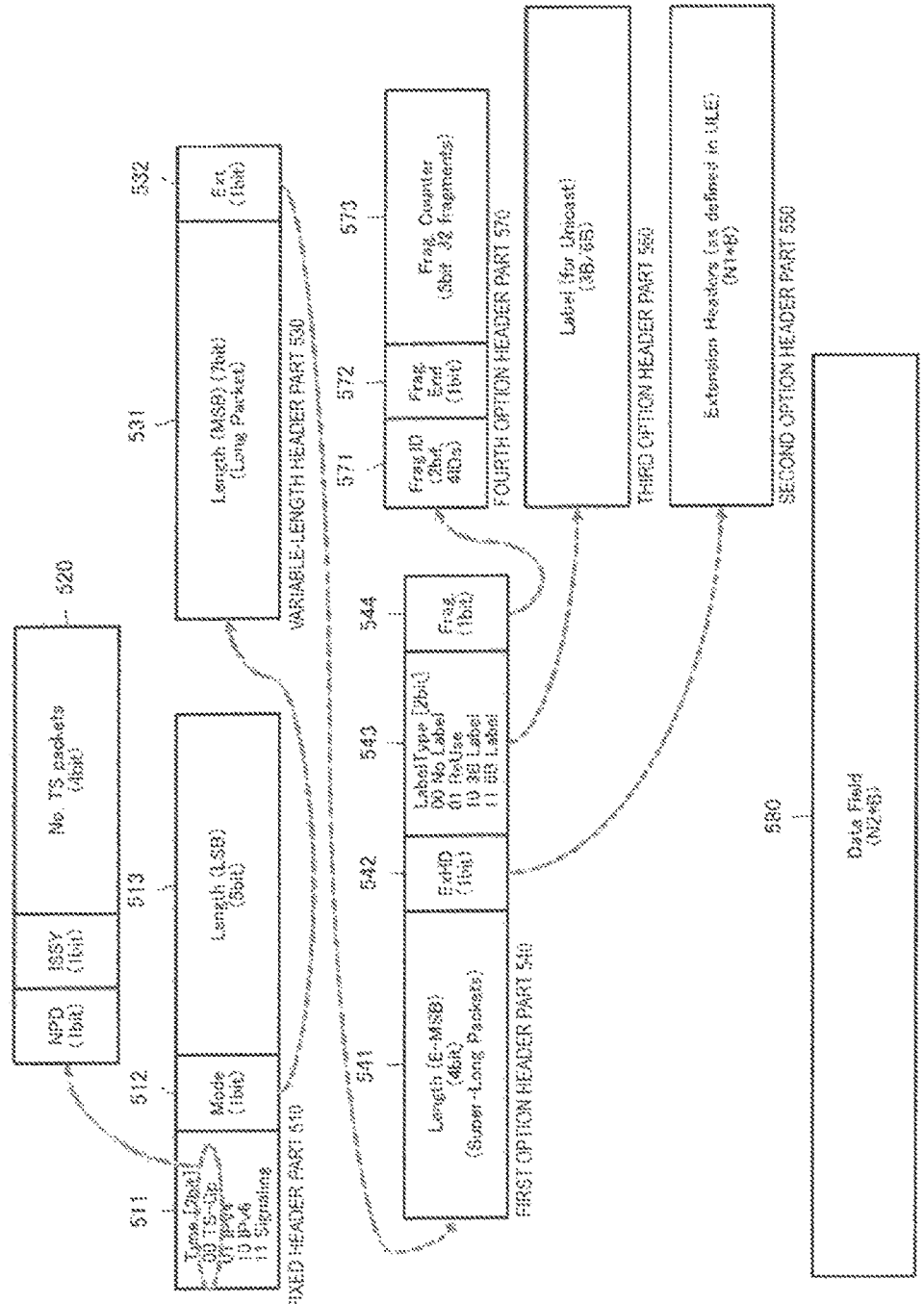
FIG. 5 is a diagram illustrating an exemplary configuration of a data link packet 420.

FIG. 5 illustrates an exemplary configuration of the data link packet 420.

A type of the data link packet 420 is indicated by a Type field 511 of the first two bits in a fixed header part 510. When the Type value is 00, the data link packet 420 is the TS standard, and portions following the Type field 511 in the fixed header 510 are replaced with a structure 520. The Type values of 01, 10, and 11 indicate IPv4 standard, IPv6 standard, and signaling, respectively.

A 1-bit Mode flag 512 following the Type field 511 indicates a long packet, and a variable header part 530 is added to the rear of the fixed header part 510. The fixed header part 510 contains a Length field 513 having a 5-bit length (in LSB position). The variable-length, header part 530 contains a Length field 531 (in MSB position) to describe a packet length of a long packet. Furthermore, when the variable-length header part 530 has an Exit flag 532 as the right-most bit, the variable-length header part 530 is additionally followed by a first option header part 540 at the end of the variable-length header part 530.

The first option header part 540 contains a Length field 541 having a 4-bit length (in E-MSB position) to describe a packet length of a super-long packet. The length field is 16 bits long in total.

When an ExHD flag is set, the first option header 540 is followed by a second option header part 550 at the end of the first option header 540. The second option header 550 includes an extension header. In the present embodiment, the signaling of emergency alert information can be stored in the extension header.

When a 2-bit Label Type field 543 has a value of 01 or 11 (i.e., 3B label or 6B label), a label for unicast is transmitted as a third option header part 560 at the end of the first option header part 540.

When a fragment flag 544 is set at the right most hit of the first option header part 540, the first option header 540 is followed by a fourth option header part 570. The fourth option header past 570 contains a 2-bit fragment indicator (Frag. ID) 571, a fragment end (Frag. End) Hag 572, and a 5-bit fragment counter (Frag. Counter) of 32 fragments.

The data link header 421 described above is followed by a data field 580 as the data link payload 422 at the end of the data link header 421.

As described above, the signaling of emergency alert information is stored in the extension header part 550 of the data link header 421. The wake-up indicator is inserted as the signaling of emergency alert information, and a category, type, occurrence time, occurrence position, and level of the disaster are described as the message of emergency alert information.

FIG. 6 illustrates the structure of the signaling of emergency alert information stored in the extension header 550 of the data link header 421.

The wake-up indicator (wake_up_indicator) 601 is information having 1-bit length, and can instruct the receiver 300 in the standby state to wake up (turning power on) by setting its value to 1 or true.

If the wake-up indicator (wake_up_indicator) 601 is set to true, then 16-bit version information (version) 602 is described and further a 4-bit message level (message_level) 603 is described.

For example, when critical emergency alert information of earthquake, tsunami tornado, flood, and forest fire is to be notified, the message level 603 is described as high. In this case, the category of disaster (category) 604, the type of disaster (type) 60S, the occurrence time of disaster (time) 606, items of the occurrence position of disaster (north_source, latitude, east_west, longitude) 607 to 610, and the scale of disaster (level) 611 are described in the signaling of emergency alert information.

When the wake-up indicator (wake_up_indicator) 601 is set to true, the indication information of an emergency alert information provider (message_provider_id) 612 is described. Furthermore, a fixed message flag (fixed_message) 613 is set to true, a 16-bit fixed message indicator (fixed_message_id) 614 is added. Moreover, the 16-bit fixed message indicator (fixed_message_id) 614 is followed by a 16-bit emergency alert message length (EAS_message_length) 615 and an emergency alert message 616 as many as the number of bytes of the emergency alert message length.

The feed message indicator (fixed_message_id) 614 is associated with a fixed message of alert, information. The receiver 300 can display the relevant fixed message by referring to the fixed message indicator (fixed_message_id) 614. The association relationship between the fixed message indicator and the fixed message is illustrated in FIG. 7. Examples of the feed message include "earthquake has occurred!", "tsunami has occurred!" and "hurricane warning".

The signaling of emergency alert information can be stored in the preamble of the transmission flume or the payload 422 of fee data link packet 420, in addition to the extension header 550 of the data link header 421. The preamble is configured to include tuning data used to tune the broadcast channel on the receiving side and a reserved hit part, but the signaling of emergency alert information can be stored in the reserved bit part.

FIG. 8 illustrates an exemplary configuration of fee signaling of emergency alert information stored in the preamble of the transmission frame or fee payload 422 of the data link packet 420. In this case, the signaling of emergency alert information is described as an emergency alert system message descriptor (EAS_message_descriptor) 801.

A table indicator (Table_id) 802 is an S-bit value determined as described later. An alert indicator (alert_id) 803 is an 8-bit value representing indication information of emergency alert information, and is used to identify the emergency alert system (EAS) message uniquely.

If the wake-up indicator (wake_up_indicator) 804 is set to true, then 16-bit version information (version) SOS is described and further a 4-bit message_level (message_level) 806 is described. When fee message_level 806 is set to high, the category of disaster (category) 807, the type of disaster (type) 808, the occurrence time of disaster (time) 809, items of the occurrence position of disaster (north_source, latitude, east_west, longitude) 810 to 813, and the scale of disaster (level) 814 are described in the signaling of emergency alert information.

When the wake-up indicator (wake_up_indicator) 804 is set to true, the indication information of an emergency alert information provider (message_provider_id) 815 is described. Furthermore, a feed message flag (fixed_message) 816 is set to true, a 16-bit fixed message indicator (fixed_message_id) 817 is added. Moreover, the 16-bit fixed message indicator (fixed_message_id) 817 is followed by a 16-bit emergency alert message length (EAS_message_length) 818 and an emergency alert message 819 as many as the number of bytes of the emergency alert message length.

A 32-bit cyclic redundancy code (CRC32) 820 is added at the end of the emergency alert system message descriptor (EAS_message_descriptor) 801.

Figure 3:
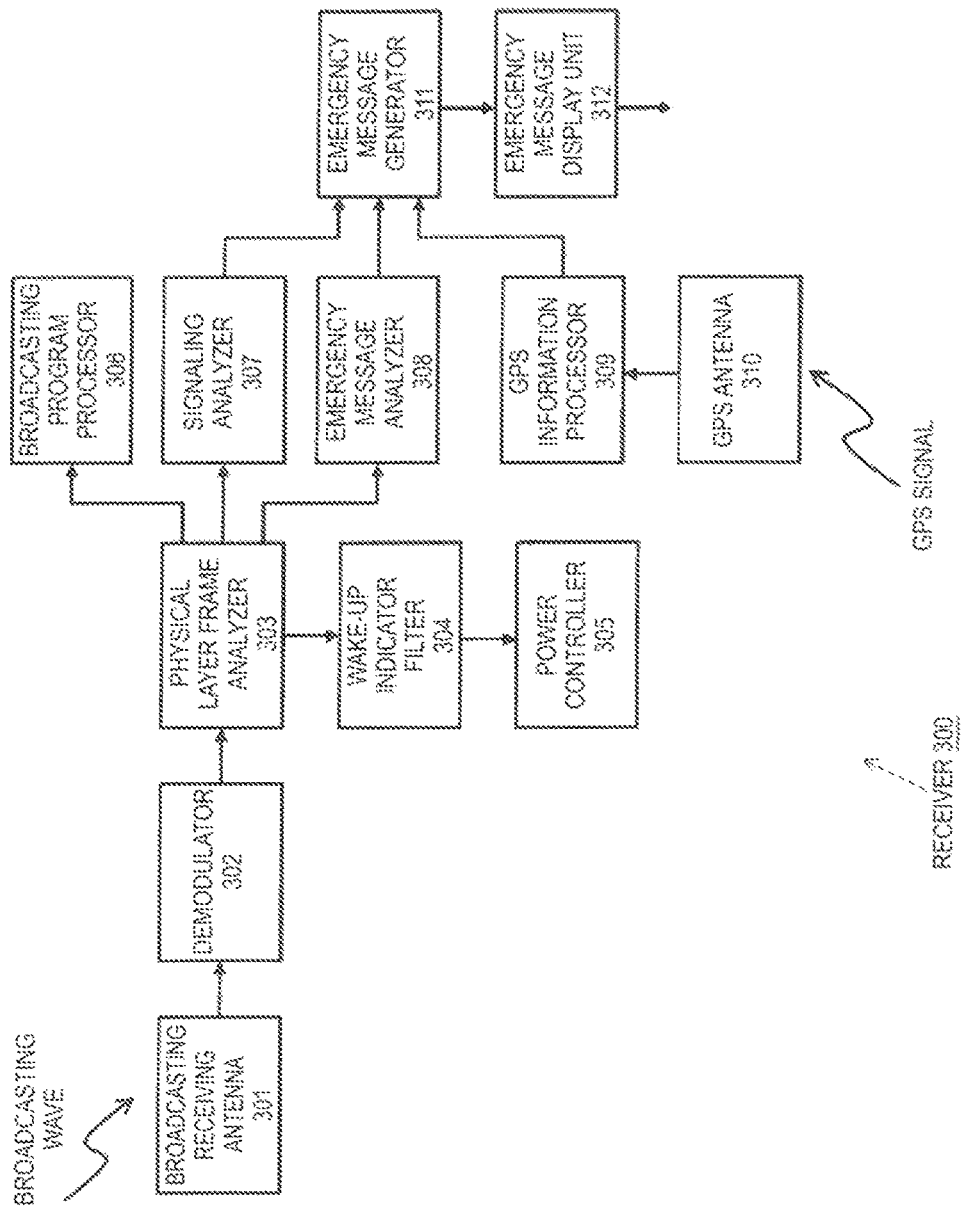
FIG. 3 is a diagram illustrating an exemplary configuration of a receiver 300.

FIG. 3 illustrates an exemplary configuration of the receiver 300 capable of processing the signaling of emergency alert information shown in FIG. 6.

A broadcast receiving antenna 301 receives a broadcast wave transmitted from the transmitter 200, such as a radio tower. A demodulator 302 performs a digital demodulation process including low-noise amplification, down-conversion, AD conversion, and OFDM demodulation on the received broadcasting signal. A physical layer frame analyser 303 analyses the demodulated physical layer.

When the receiver 300 is in standby mode, the demodulator 302 and the physical layer frame analyzer 303 both wake up regularly and receive intermittently, and other functional modules are set to power off state.

A wake-up indicator (wake_up_Indicator) filter 304 refers to the wake-up indicator (wake_up_indicator) stored in the signaling of emergency alert information. When a true value is written in the wake-up indicator, the wake-up indicator (wake_up_indicator) filter 304 instructs a power controller 305 to power on components and shifts the receiver 300 to the normal mode.

A broadcasting program processor 306 processes information of the broadcasting program transmitted in the payload such as AV content or data broadcasting accompanying it as a process on the middleware layer and further higher layers. A method of processing the broadcasting program itself is not directly related to the technology described herein, and thus a detailed description will be omitted.

A signaling analyzer 307 analyzes the signaling of emergency alert information including the category of disaster, the type of disaster, the occurrence time of disaster, the occurrence position of disaster, and the scale of disaster (stored in the extension header of the data link packet). An emergency message analyzer 308 analyzes a message of emergency alert information including a fixed_message (fixed_message) and emergency alert, message (EAS_message) (both are stored in the extension header of the data link packet).

A global positioning system (GPS) information processor 309 processes a GPS signal received via a GPS antenna 310 from a GPS satellite and acquires the current position information of the receiver 300.

An emergency message generator 311 generates an emergency message based on the signaling and the message of emergency alert information and the current position information. An emergency message display unit 312 displays the generated emergency message. For example, when the current position information is within the target area for an alert and evacuation, alert information and an evacuation instruction message are generated and displayed. However, if the current position information is outside the target area for an alert and evacuation, then only the message of emergency alert information is generated and displayed. Thus, when the category of disaster is a meteorological disaster, the receiver 300 presents the effect useful in evacuation guidance by displaying an appropriate evacuation route from its own position information.

The emergency message display unit 312 may be the same device as a display unit (not shown) for displaying the broadcasting program processed by the broadcasting program processor 306 on a display screen, or may be a different device. The emergency message display unit 312 may be digital signage or streetlights installed throughout the city.

Figure 9:
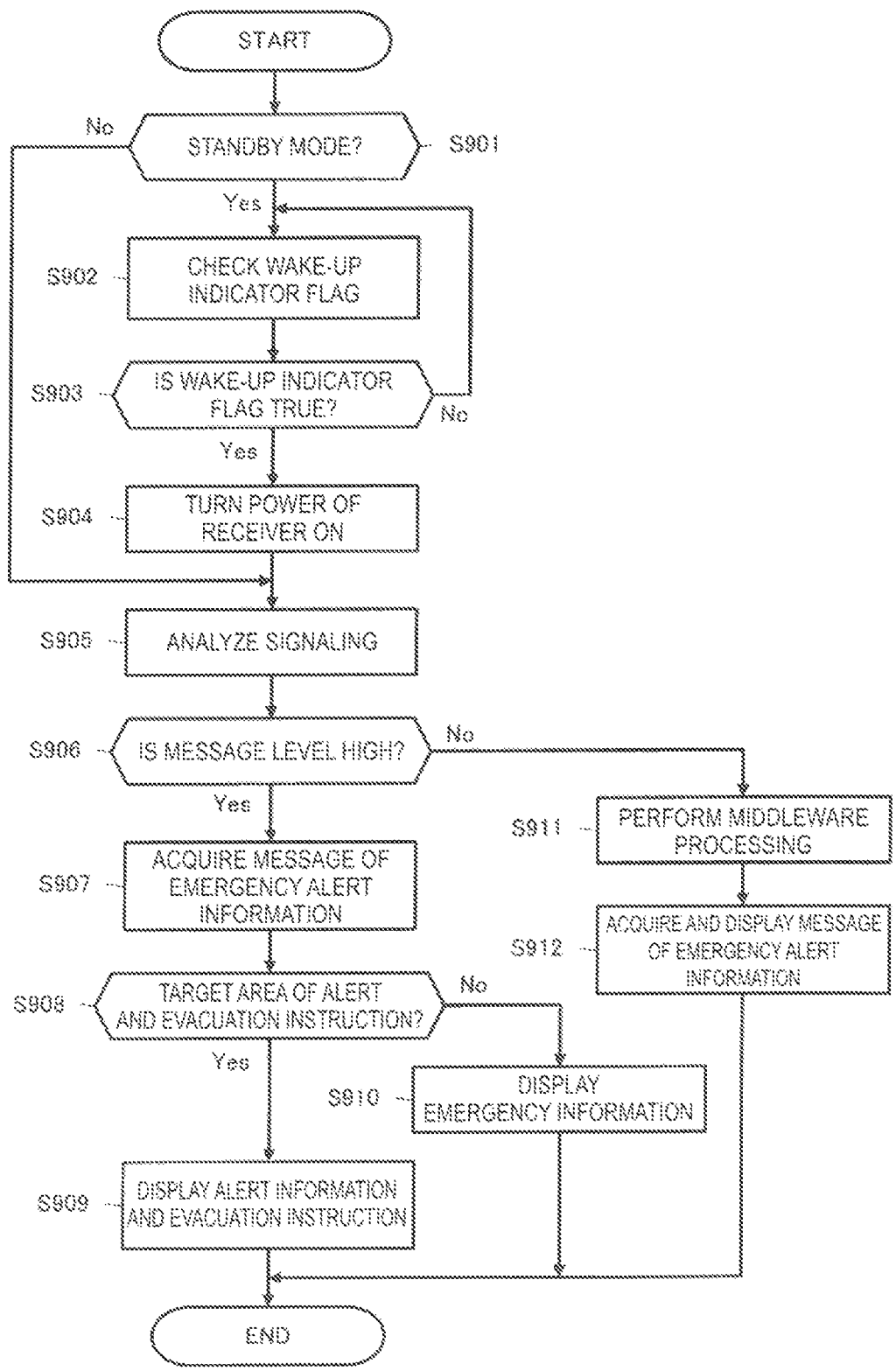
FIG. 9 is a flowchart illustrating a process procedure executed upon reception of a broadcasting signal by the receiver 300 shown in FIG. 3.

FIG. 9 a flowchart illustrating a processing procedure to be executed upon reception of a broadcasting signal by the receiver 300 shown in FIG. 3.

When the receiver 300 performs the intermittent reception in the standby mode (Yes in step S901), the demodulator 302 demodulates the broadcast wave received via the broadcast receiving antenna 301 and the physical layer frame analyzer 303 analyzes the physical layer frame. Then, the wake-up indicator filter 304 checks the wake-up indicator flag (wake_up indicator) stored in the extension header of the data link packet (step S902).

If the wake-up indicator flag is true (Yes in step S903), then the power controller 305 turns the power of the components on (step S904) and shifts the receiver 300 to the normal mode. When the receiver 300 has been set to perform continuous reception in the normal mode (No in step S901), steps 901 to S904 are skipped.

Then, the signaling analyzer 307 analyzes the signaling of emergency alert information transmitted as the extension header of the data link packet (step S905), and checks the message level (step S906).

If the message level is high (Yes in step S906), the emergency message analyzer 308 analyzes the message of emergency alert information including a fixed message (fixed_message) and emergency alert message (EAS_message) (both are stored in the extension header of the data link packet) (step S907).

Then, the emergency message generator 311 checks whether the receiver 300 is within the target area for the alert and evacuation instruction based, on the original sin position information obtained by the GPS information processor 309 and the position information of the disaster area contained in the signaling of emergency alert information (step S908).

If the receiver 300 is within the target area for the alert and evacuation instruction (Yes in step S908), the emergency message generator 311 generates a message of emergency alert information and the evacuation instruction and displays them on the emergency message display unit 312 (step S909), and then this processing routine is terminated. If the receiver 300 is outside the target area for the alert and evacuation instruction (No in step S908), the emergency message generator 311 generates only a message of emergency alert information and displays it on the emergency message display unit 312 (step S910), and then this processing routine is terminated.

On the other hand, if the message_level is not high (No in step S906), the broadcasting program processor 306 performs a process on the middleware layer and further higher layers (step S911), acquires the message of emergency alert information transmitted using the packet structure of the middleware layer, and then displays the message (step S912).

Examples of the message of emergency alert information transmitted using the packet structure of the middleware layer include the EAT-MH in the service signaling channel of the ATSC M/H (described above). When the receiver 300 is configured as a simple and inexpensive receiver for emergency alert information having only a receiving antenna for broadcasting and a demodulator, the middleware processing in steps S911 and S912 will be skipped.

As described above, in the emergency information transmission system 1 according to the present embodiment, the transmitter 200 uses the packet structure of the physical layer or the extension header of the data link layer to transmit the signaling and the message of emergency alert information in the broadcasting service. Thus, the receiver 300 can be configured as a simple and inexpensive device for emergency alert information without being equipped with a toner for digital television broadcasting.

For example, the emergency alert information transmission system 1 can be configured by setting digital signage (electronic signboard), streetlights, or a vehicle that is not equipped with a television tuner as the receiver 300. In this case, the message of emergency alert information can be displayed throughout the city in a short time, which leads to the contribution to the instruction of an evacuation route.

FIG. 10 illustrates an embodiment in which streetlights installed in the city are respectively equipped with the function of the receiver 300.

The streetlights 1001, 1002 . . . may be respectively equipped with the function of the receiver 300. In this case, the streetlights selectively flash at an appropriate flashing interval on each of one or more routes used to evacuate to a shelter 100B from the position information of each receiver 300 and the position information of a disaster ansa 100A indicated by the signaling of emergency alert information. Thus, the evacuation route can be specified and the guidance to the shelter 100B can be provided.

The evacuation guidance is performed by flashing the streetlights as shown in FIG. 10, and thus it is not necessary for the receiver 300 mounted on the streetlights 1001, 1002 . . . to have the message displaying function. In other words, the functional modules of the emergency message analyzer 308, the emergency message generator 311, and the emergency message display unit 312 of the receivers 300 shown in FIG. 3 are net necessarily included.

FIG. 12 illustrates another example of the evacuation, guidance using the flashing. In this example, when a disaster occurred at another location of a disaster area 1200A, streetlights 1201, 1202 . . . perform different flashing patterns corresponding to the respective evacuation routes. Thus, it is possible to notify an evacuation route in an appropriate manner and perform the evacuation guidance to any appropriate shelter. FIG. 12 illustrates a flashing control of a group of the streetlights 1201, 1202 . . . that constitute the evacuation route to the same shelter 1200B. An ID for controlling a flashing operation is transmitted to each of the streetlights 1201 . . . through the broadcasting signal. The change in the ID for controlling a flashing operation (EAS_message_id) with time allows the flashing of each of the streetlights 1201 . . . to be controlled.

FIG. 13 illustrates the structure of the signaling of emergency alert information that contains die ID for controlling the flashing operation (Eas_message_id) 617. The EAS_message_id 617 is used for the flashing control (lighting ID and extinction ID) of the evacuation guidance by a streetlight shown in FIG. 12. The EAS_message_id 617 has one value of 1 to 15. The EAS_message_id 617 is transmitted by incrementing by one at a prescribed period (e.g. one second). If the value reaches 15, the value retains to zero and then this process is looped.

FIG. 11 illustrates an embodiment in which, the digital signage is equipped with the function of the receiver 300.

When a disaster such as a forest fire 1100A occurs, a disaster information administration, bureau 1101 transmits, for example, disaster information in a predetermined file format to a broadcasting station 1102. Emergency alert information is generated from tire received disaster information. Then, the broadcasting station 1102 stores the signaling and the message of emergency alert information, in broadcasting waves 1103A, 1103B, and 1103C transmitted from a radio tower 1103 using the packet structure of the physical layer and the extension header of the data link layer.

The digital signage 1110A to 1110G equipped with the function of the receiver 300 can analyze the physical layer of the received broadcasting waves and can acquire the signaling and the message of emergency alert, information. When each of the digital signage 1110A to 1110G receives the GPS signals 1120A, 1120B, and 1120C from a GPS satellite 1120 and acquires their respective current positions, the message of emergency alert information is displayed based on the their position information and the position information of the disaster area.

For example, the disaster information and the evacuation instruction are displayed on the digital signage 1110A to 1110E installed in the locations 1131 and 1132 near the disaster area. On the other hand, only the disaster information is displayed on the digital signage 1110F and 1110G installed in the location 1133 relatively far from the disaster area since there is no necessity to evacuate.

CITATION LIST

Patent Literature

Patent Literature 1: JP 2010-035085A
Patent Literature 2: U.S. Pat. No. 8,458,752B2

INDUSTRIAL APPLICABILITY

As described shove, illustrative embodiments concerning the technology disclosed herein have been described in detail. However, it will be obvious to those skilled in the art that modifications and changes may be made without departing from the spirit and scope of the technology disclosed herein.

The technology disclosed herein is applicable to a broadcast system based on the ATSC broadcasting standard employed in the United States or other countries or a broadcast system based on the ATSC mobile/handheld (M/H) that allows an ATSC broadcasting service to be received by ATSC mobile devices. In particular, the technology disclosed herein applied to the broadcast service for mobile devices enables the emergency information to be received by a simple and inexpensive broadcasting receiver in a wide range of locations capable of receiving a broadcasting wave, thereby implementing the advanced and sophisticated emergency broadcasting service.

In short, the present technology has been disclosed in a form of illustration and should not be interpreted limitedly. To determine the gist of the present disclosure, patent claims should be taken into account.

Additionally, the present technology may also be configured as below.

(1)
A transmitter including:
an emergency alert information acquisition unit configured to acquire emergency alert information; and
a transmuting unit configured to transmit the emergency alert information using a packet structure of a physical layer or an extension header of a data link layer.

(2)
The transmitter according to (1),
wherein the transmitting unit transmits the transmission frame in a broadcast channel assigned to a broadcasting station.

(3)
The transmitter according to (2), further including:
a broadcast content acquisition unit configured to acquire broadcast content,
wherein the transmitting unit transmits the broadcast content using a packet structure of a middleware layer.

(4)
The transmitter according to (1),
wherein the transmitting unit stores signaling and message of the emergency alert information in a header of a data link packet.

(5)
The transmitter according to (4),
wherein the transmitting unit inserts a wake-up indicator to be used, for a receiver into the signaling of the emergency alert information.

(6)
The transmitter according to (4),
wherein the transmitting unit inserts a level of a message into the signaling of the emergency alert information.

(7)
The transmitter according to (4),
wherein the transmitting unit inserts at least one of a category of disaster, a type of disaster, an occurrence time of disaster, an occurrence position of disaster, and a scale of disaster into the signaling of the emergency alert information.

(8)
The transmitter according to (4),
wherein, the transmitting unit inserts indication information indicating a fixed length message or a variable length message into the message of the emergency alert information.

(9)
The transmitter according to (4),
wherein the transmitting unit atoms the signaling and the message of the emergency alert information using an extension header of a data link packet.

(10)
A transmission method including:
an emergency alert information acquisition step of acquiring emergency alert information; and
a transmission step of transmitting the emergency alert information using a packet structure of a physical layer or an extension header of a data link layer.

(11)
A receiver including:
a receiving antenna;
a demodulator configured to demodulate a signal received via the receiving antenna; and
a processor configured to process emergency alert information included in a packet structure of a physical layer or an extension header of a data link layer in a received frame.

(12)
Hie receiver according to (11),
wherein the processor analyzes signaling of die emergency alert information stored in a header of a received data link, packet and displays an emergency message based on a result obtained by the analysis.

(13)
The receiver according to (12),
wherein the processor analyses tire signaling of the emergency alert information including at least one of a category of disaster, a type of disaster, an occurrence time of disaster, an occurrence position of disaster, and a scale of disaster.

(14)
The receiver according to (11),
wherein the processor analyzes a message of the emergency alert information stored in a header of a received data link packet and displays an emergency message based on a result obtained by the analysis,

(15)
The receiver according to (14),
wherein the processor analyzes the message of the emergency alert information including indication information indicating a fixed length message or a variable length message.

(16)
The receiver according to (11), further including:
a position information acquisition writ configured to acquire position information,
wherein the processor displays an emergency message based on a result obtained by analyzing the emergency alert information stored in a header of a received data link packet and the position information.

(17)
The receiver according to (16),
wherein the emergency alert information includes information regarding a position at which a disaster occurs, and wherein the processor displays a message of alert information and an evacuation instruction when the position information is within a target area for an alert and an evacuation, and the processor generates and displays only the message of the emergency alert information when the position information is outside the target area for the alert and the evacuation.

(18)

The receiver according to (11), further including:

a wake-up indicator filter configured to detect a wakeup indicator included in the emergency alert information; and a power controller configured to control a power source in the receiver based on a result obtained by the detection.

(19)

A reception method including:

a demodulation step of demodulating a received signal; and a processing step of processing emergency alert information included in a packet structure of a physical layer or an extension header of a data link layer in a received frame.

(20)

A computer program written in a computer-readable form for causing a computer to function as:

a demodulator configured to demodulate a received signal; and a processor configured to process emergency alert information included in a packet structure of a physical layer or an extension header of data link layer in a received frame.

REFERENCE SIGNS LIST 1 emergency alert information transmission system
100 information providing device
200 transmitter
201 emergency alert information receiving unit
202 emergency alert information processor
203 program content acquisition unit
204 broadcasting signal generator
205 broadcasting signal transmitting unit
300 receiver
301 broadcast receiving antenna
302 demodulator
303 physical layer frame analyser
304 wake-up indicator filter
305 power controller
306 broadcasting program processor
307 signaling analyzer
308 emergency message analyzer
309 GPS information processor
310 GPS antenna
311 emergency message generator
312 emergency message display unit

The invention claimed is:

1. A transmitter, comprising:
one or more processors configured to:
acquire first information corresponding to one or more events;
insert, into signaling of the first information, second information that indicates to a receiver at least a presence of the first information;
insert, into the signaling of the first information, a level of the one or more events based on criticality of the one or more events in the acquired first information;
determine an extension header in a data link layer packet of the data link layer based on a setting of each of a plurality of header items in a plurality of headers of the data link layer packet;
store the signaling of the first information and a message of the first information in the determined extension header;
transmit, to the receiver, the signaling of the first information using the determined extension header of the data link layer packet; and
transmit, to the receiver, the signaling of the first information using a packet structure of a middleware layer, such that the receiver selects, based on the inserted level, which of the first information included in the extension header of the data link layer packet or the packet structure of the middleware layer to process,
wherein the first information includes emergency alert information, and the second information includes a wake-up indicator that indicates the presence of the emergency alert information.

2. The transmitter according to claim 1,
wherein the one or more processors are further configured to transmit a transmission frame in a broadcast channel assigned to a broadcasting station.

3. The transmitter according to claim 2,
wherein the one or more processors are configured to:
acquire broadcast content; and
transmit the acquired broadcast content using the packet structure of the middleware layer.

4. The transmitter according to claim 1,
wherein the inserted second information into the signaling of the first information
further indicates, based on a first operating mode of the receiver, a second operating mode in which the receiver is required to process the signaling and the message of the first information.

5. The transmitter according to claim 1,
wherein the one or more processors are further configured to insert into the signaling of the first information, at least one of a category, a type, an occurrence time, an occurrence position, or a scale of the one or more events.

6. The transmitter according to claim 1,
wherein the one or more processors are further configured to transmit the signaling and the message of the first information along with a broadcasting content.

7. A transmission method, comprising;
acquiring first information corresponding to one or more events;
inserting, using one or more processors, into signaling of the first information, second information that indicates to a receiver at least a presence of the first information;
inserting, into the signaling of the first information, a level of the one or more events based on criticality of the one or more events in the acquired first information;
determining an extension header in a data link layer packet of the data link layer based on a setting of each of a plurality of header items in a plurality of headers of the data link layer packet;
storing the signaling of the first information and a message of the first information in the determined extension header;
transmitting, to the receiver, the signaling of the first information using the determined extension header of the data link layer packet; and
transmitting, to the receiver, the signaling of the first information using a packet structure of a middleware layer, such that the receiver selects, based on the inserted level, which of the first information included in the extension header of data link layer packet or the packet structure of the middleware layer to process, wherein the first information includes emergency alert information, and the second information includes a wake-up indicator that indicates the presence of the emergency alert information.

8. A receiver, comprising:
one or more processors configured to:
receive, from a transmitter, broadcasting content;
demodulate the received broadcasting content;
detect a presence of first information corresponding to one or more events in the demodulated broadcasting content;
detect a level of the one or more events in the demodulated broadcasting content, the level being inserted into signaling of the first information based on criticality of the one or more events; and
process, dependent on the detected level, either the first information included in an extension header of a data link layer packet, or the first information included in a packet structure of a middleware layer,
wherein the presence of the first information is indicated by at least second information, which is inserted by the transmitter into signaling of the first information, and
wherein the first information includes emergency alert information, and the second information includes a wake-up indicator that indicates the presence of the emergency alert information.

9. The receiver according to claim 8,
wherein the one or more processors are further configured to:
analyze the signaling of the first information stored in the extension header; and
display an emergency message based on a result of the analysis.

10. The receiver according to claim 9,
wherein the one or more processors are further configured to analyze the signaling of the first information including at least one of a category, a type, an occurrence time, an occurrence position, and a scale of the one or more events.

11. The receiver according to claim 8,
wherein the one or more processors are further configured to:
analyze a message of the first information stored in the extension header of a received data link packet; and
display an emergency message based on a result of the analysis.

12. The receiver according to claim 8,
wherein the one or more processors are further configured to:
acquire a first position information indicating a current position of the receiver; and
display an emergency message based on a result of analysis of the first information stored in the extension header and the first position information.

13. The receiver according to claim 12,
wherein the first information includes a second position information indicating a position of occurrence of at least one of the one or more events, and
wherein the one or more processors are further configured to:
determine a target area for an alert and an evacuation based on the second position information; and
display at least one of:
the emergency message of and an evacuation instruction based on the first position information, which is within the determined target area, or
the emergency message based on the first position information, which is outside the determined target area for the alert and the evacuation.

14. The receiver according to claim 8, further comprising:
a power controller configured to control a power source in the receiver based on the second information.

15. A reception method, comprising:
demodulating broadcasting content received from a transmitter;
detecting a presence of first information corresponding to one or more events in the demodulated broadcasting content;
detecting a level of the one or more events in the demodulated broadcasting content, the level being inserted into signaling of the first information based on criticality of the one or more events; and
processing, using one or more processors, dependent on the detected level, either the first information included in an extension header of a data link layer packet in a received frame, or the first information included in a packet structure of a middleware layer,
wherein the presence of the first information is indicated by at least second information, which is inserted by the transmitter into signaling of the first information, and
wherein the first information includes emergency alert information, and the second information includes a wake-up indicator that indicates the presence of the emergency alert information.

16. A non-transitory computer-readable storage medium having stored thereon, computer-executable instructions for causing a computer to execute operations, the operations comprising:
demodulating broadcasting content received from a transmitter;
detecting a presence of first information corresponding to one or more events in the demodulated broadcasting content;
detecting a level of the one or more events in the demodulated broadcasting content, the level being inserted into signaling of the first information based on criticality of the one or more events; and
processing, dependent on the detected level, either the first information included in an extension header of a data link layer packet, or the first information included in a packet structure of a middleware layer,
wherein the presence of the first information is indicated by at least second information, which is inserted by the transmitter into signaling of the first information, and
wherein the first information includes emergency alert information, and the second information includes a wake-up indicator that indicates the presence of the emergency alert information.

17. The transmitter according to claim 1,
wherein the receiver selects the first information included in the extension header of the data link layer packet to process in a case the receiver determines the inserted level to be high.

18. The receiver according to claim 8,
wherein the one or more processors are configured to select the first information included in the extension header of the data link layer packet to process in a case the one or more processors determines the inserted level to be high.

* * * * *